United States Patent
Senda et al.

(10) Patent No.: US 7,646,370 B2
(45) Date of Patent: *Jan. 12, 2010

(54) DISPLAY DEVICE

(75) Inventors: Michiru Senda, Gifu (JP); Koji Hirosawa, Ichinomiya (JP); Ryoichi Yokoyama, Ogaki (JP)

(73) Assignee: Sanyo Electric Co., Ltd. (JP)

( * ) Notice: Subject to any disclaimer, the term of this patent is extended or adjusted under 35 U.S.C. 154(b) by 628 days.

This patent is subject to a terminal disclaimer.

(21) Appl. No.: 11/133,882

(22) Filed: May 20, 2005

(65) Prior Publication Data

US 2005/0259062 A1    Nov. 24, 2005

(30) Foreign Application Priority Data

| May 21, 2004 | (JP) | ............................. 2004-152485 |
| May 21, 2004 | (JP) | ............................. 2004-152489 |
| May 21, 2004 | (JP) | ............................. 2004-152493 |
| May 21, 2004 | (JP) | ............................. 2004-152497 |

(51) Int. Cl.
   G09G 3/36    (2006.01)
(52) U.S. Cl. ............................. 345/90; 345/51; 345/87; 349/39
(58) Field of Classification Search ........... 345/87–100, 345/204, 205; 349/41–44, 88
   See application file for complete search history.

(56) References Cited

U.S. PATENT DOCUMENTS

| 5,923,310 | A | 7/1999 | Kim |
| 6,897,845 | B2 | 5/2005 | Ozawa |
| 2002/0149724 | A1 | 10/2002 | Kawachi et al. |
| 2002/0180673 | A1 | 12/2002 | Tsuda et al. |
| 2003/0112213 | A1 | 6/2003 | Noguchi et al. |
| 2003/0164916 | A1 | 9/2003 | Chien et al. |
| 2004/0164942 | A1* | 8/2004 | Shih et al. ...................... 345/90 |
| 2005/0259062 | A1* | 11/2005 | Senda et al. .................. 345/98 |
| 2005/0264509 | A1* | 12/2005 | Senda et al. .................. 345/90 |

(Continued)

FOREIGN PATENT DOCUMENTS

JP    5-72995 A    3/1993

(Continued)

OTHER PUBLICATIONS

Office Action mailed May 18, 2006 for corresponding Taiwanese application No. 94116430, with brief summary. JP Patent Laid-Open Publication No. Hei 9-113933, dated Feb. 5, 1997, with English Abstract.

(Continued)

*Primary Examiner*—Regina Liang
*Assistant Examiner*—Jennifer T Nguyen
(74) *Attorney, Agent, or Firm*—Cantor Colburn LLP

(57) ABSTRACT

The level of a storage capacitor line changes between two types, an H level and an L level. As a result of this change, the voltage applied to a liquid crystal is shifted so that a sufficient voltage is applied to the liquid crystal to perform a display operation. Then, by changing the voltage value of the difference between a first level and a second level, the contrast and screen brightness are adjusted. Furthermore, the capacitances generated at the locations where the two storage capacitor lines and the data line intersect are set to be substantially the same.

10 Claims, 9 Drawing Sheets

U.S. PATENT DOCUMENTS

2006/0119755 A1 * 6/2006 Senda et al. .................. 349/38

FOREIGN PATENT DOCUMENTS

JP 2004-46180 2/2004

OTHER PUBLICATIONS

Office Action for corresponding Taiwanese Patent Application No. 094115747 and its excerpt English translation.

United States Office Action for U.S. Appl. No. 11/133,950 mailed Mar. 5, 2008.

Japanese Laid-Open Publication No. 2003-150127 with its English abstract.

Office Action for U.S. Appl. No. 11/133,950 dated Oct. 10, 2008.

United States Office Action for U.S. Appl. No. 11/133,019 dated Feb. 25, 2009.

USPTO Office Action for U.S. Appl. No. 11/133,950 dated Apr. 2, 2009.

* cited by examiner

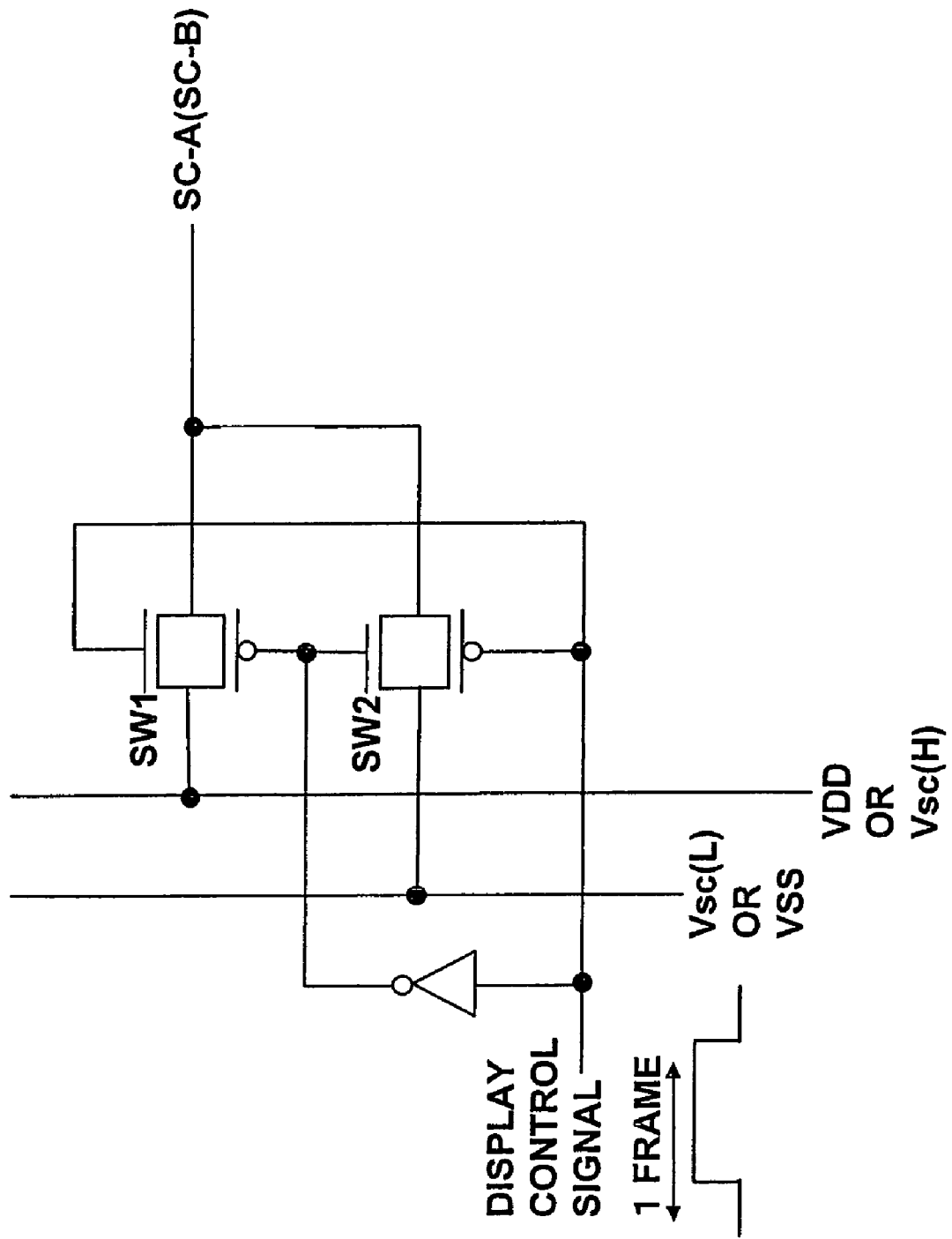

DISPLAY DEVICE

CROSS-REFERENCE TO RELATED APPLICATION

The entire disclosure of Japanese Patent Application Nos. 2004-152485, 2004-152489, 2004-152493, and 2004-152497 including specification, claims, drawings and abstract is incorporated herein by reference.

BACKGROUND OF THE INVENTION

1. Field of the Invention

The present invention relates to a display device having display circuits arranged in a matrix configuration.

2. Description of the Related Art

Conventionally, liquid crystal display devices are known as low power consumption display devices that can assume a thinner and more lightweight form and are employed in various types of equipment as display devices. Liquid crystal display devices (hereinafter referred to as LCD) have two substrates with electrodes formed on opposing sides thereof, laminated with liquid crystals injected between them. A display operation is performed by applying a voltage signal across the electrodes to control the alignment of the liquid crystals, the optical characteristics of which change according to the alignment so as to control the transmissivity of light from a light source.

It is well known that when a DC voltage is continuously applied across electrodes formed on opposing surfaces of the substrates, the alignment of the liquid crystal molecules becomes fixed, namely, the problem of screen burn-in occurs. Thus, an AC voltage signal having a polarity that periodically inverts with respect to a reference voltage is conventionally used as the voltage signal for driving the liquid crystals.

Well known methods for inverting the polarity of the liquid crystal driving voltage signal in a liquid crystal display device having a plurality of pixels arranged in a matrix configuration are inversion at every frame, inversion at every vertical scan (1V) or field, inversion at every horizontal scan (1H), and inversion at every pixel (dot). A frame unit corresponds to a frame in an NTSC signal, for example, and a field unit corresponds to various units (for example, odd fields and even fields) of a plurality of fields forming one frame.

In Japanese Patent Laid-Open Publication No. 2003-150127, the dot inversion method for inverting the polarity in one-pixel (dot) units is preferable among the above-mentioned methods as the adverse effect of inversion on display quality is least likely to appear. However, a problem was that its driving method is likely to become complex.

It should be noted that modifying the voltage of an SC line, which is a line that becomes a base for a storage capacitance, has been proposed in the dot inversion method in Japanese Patent Laid-Open Publication No. 2003-150127.

SUMMARY OF THE INVENTION

According to the present invention, changing the voltage value of the difference between a first level and a second level in a storage capacitor line enables the contrast and screen brightness to be adjusted.

Therefore, adjustments of brightness and contrast can be performed without changing power source voltages or converting data signals.

Furthermore, the capacitances generated at the locations where the two storage capacitor lines and the data lines intersect are set to be substantially the same. For this reason, during the voltage inversion of the two storage capacitor lines, fluctuations in the potential of the data lines can be minimized so as to reduce adverse effects on the display.

BRIEF DESCRIPTION OF THE DRAWINGS

FIG. 8 shows a configuration of an SC driver.

DETAILED DESCRIPTION OF THE PREFERRED EMBODIMENTS

The present invention will be described hereinafter with reference to the attached drawings.

Figure 1:
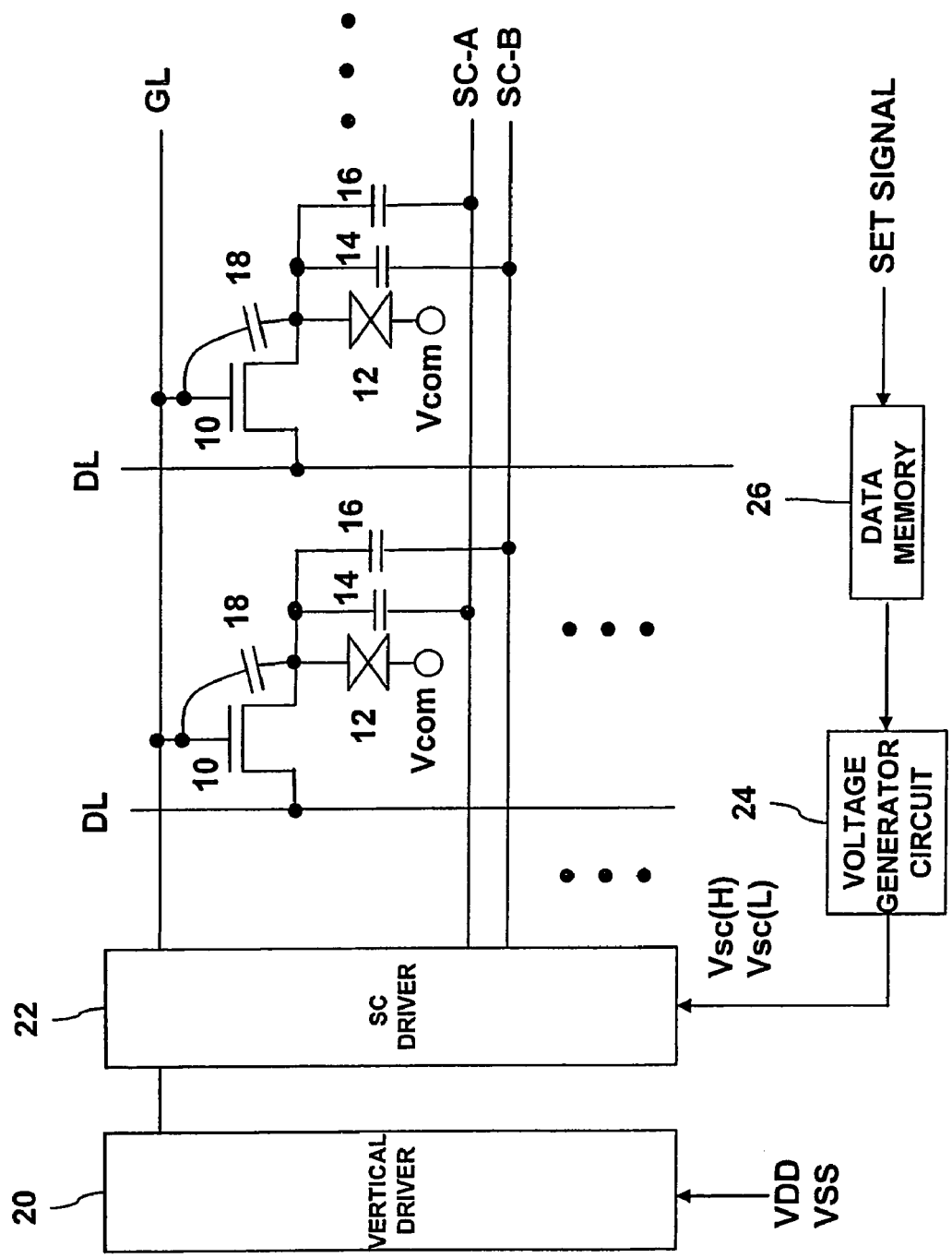
FIG. 1 shows a configuration of an embodiment.

FIG. 1 is a block diagram of the embodiment. Pixel circuit 1 is arranged in a matrix on the entire display region. The matrix arrangement may have a zigzag form and need not be a perfect lattice. Furthermore, the display may be monochrome or full color. In the case of full color, although the pixels normally have the three RGB colors, it is also preferable to add specific color pixels including white as necessary.

As shown in the figure, one pixel circuit 1 comprises a pixel TFT 10 for each of n channels with each drain connected to a data line DL, and a liquid crystal element 12 and a storage capacitor 14 connected to the source of the pixel TFT 10. To the gate of the pixel TFT 10 is connected a gate line GL disposed at each horizontal scan line. A gate capacitor 18 inevitably develops between the gate and source of the pixel TFT 10.

The liquid crystal element 12 is configured so that a pixel electrode provided individually at each pixel is connected to the source of the pixel TFT 10, and opposed to this pixel electrode so as to sandwich a liquid crystal material is disposed a common electrode for all pixels. The common electrode is connected to a common electrode power source Vcom.

Furthermore, the storage capacitor 14 has one electrode which is an extension of the semiconductor layer forming the source of the pixel TFT 10 and a counter electrode which is part of a capacitance line SC formed in opposition via an oxide film. The parts that form the electrodes of the storage capacitor 14 may be separated into a different semiconductor layer from that of the pixel TFT 10 with both connected by metal wires.

Two capacitance lines SC, SC-A and SC-B, are provided for one line (horizontal scan line), and in the direction of the horizontal scan, the storage capacitor of each pixel circuit alternately connects to SC-A and SC-B. The storage capacitor 14 of the pixel circuit shown on the left side in the figure is connected to the capacitance line SC-A and the storage capacitor 14 of the adjacent pixel is connected to the capacitance line SC-B.

Furthermore, in this pixel, the capacitance line SC-B is not connected but passes through the pixel region. Therefore, a stray (parasitic) capacitance 16 develops between the pixel electrode of the liquid crystal element 12 and the capacitance line SC-B.

To the gate line GL is connected a vertical driver 20. The vertical driver 20 sequentially selects and sets to an H level one gate line GL at a time at each horizontal period. The vertical driver 20 has a shift register so that when a signal STV indicating the start of one vertical scan period is received and the first stage of the shift register is set to the H level, the H level is shifted one at a time thereafter by a clock signal, for example, so that the gate line GL for each horizontal scan line is selected and set to an H level one line at a time. As an example herein, the H level for the gate line GL is the VDD potential and the L level is the VSS potential. These power source voltages VDD and VSS are supplied to the vertical driver 20 so that the H level and L level are set for the gate line GL, which is the output of the vertical driver.

An SC driver 22 outputs two voltage levels to two storage capacitor lines SC-A and SC-B.

Namely, in this embodiment, the SC driver 22 receives the supply of two voltage levels, $V_{SC}$ (H) and $V_{SC}$ (L), from a voltage generator circuit 24 for use in controlling the voltages of the two storage capacitor lines SC-A and SC-B. Furthermore, the voltage generator circuit 24 generates $V_{SC}$ (H) and $V_{SC}$ (L) on the basis of preset data stored in a data memory 26.

The preset data within the data memory 26 can be rewritten by a setting signal that is supplied from an external source, and the preset data corresponding to the setting signal is stored into the data memory 26. The voltage generator circuit 24 generates $V_{SC}$ (H) and $V_{SC}$ (L) on the basis of preset data stored in the data memory 26. Therefore, $V_{SC}$ (H) and $V_{SC}$ (L) can be set by the setting signal. The voltage generator circuit utilizes $V_{SC}$ (H) and $V_{SC}$ (L) from VDD and VSS and uses a constant voltage generator circuit to generate $V_{SC}$ (H) and $V_{SC}$ (L). For a simple configuration, a resistive potential divider or the like can be utilized.

It should be noted that the setting signal may be stored into the data memory 26, such as by serial transfer from an external microcomputer.

The display device usually is provided with adjustment buttons for contrast and brightness, and the setting signal is determined according to their preset values and stored into the data memory 26.

Although not shown in the figure, the display device is also provided with a horizontal driver, for example, to control the line-sequential supply to the data line DL of a video signal that is input. Namely, in this example, the horizontal driver outputs a sampling clock for each pixel in accordance with a video signal clock for each pixel. This sampling clock turns a switch on and off and latches the video signal (data signal) for one horizontal scan line. The data signal for each pixel in the latched horizontal scan line is output during one horizontal scan period to the data line DL.

In actuality, there are three types of video signals for RGB and each pixel in the vertical direction has the same color as one of R, G, or B. Consequently, the data line DL is set with the data signal for one of the RGB colors.

The device of this embodiment employs an AC application method for the dot inversion method. Namely, at each pixel (dot) in the horizontal scan direction, the voltage applied to the pixel electrode of the liquid crystal element 12 is applied as a data signal having an opposite polarity with respect to the voltage Vcom of the common electrode.

Figure 3:
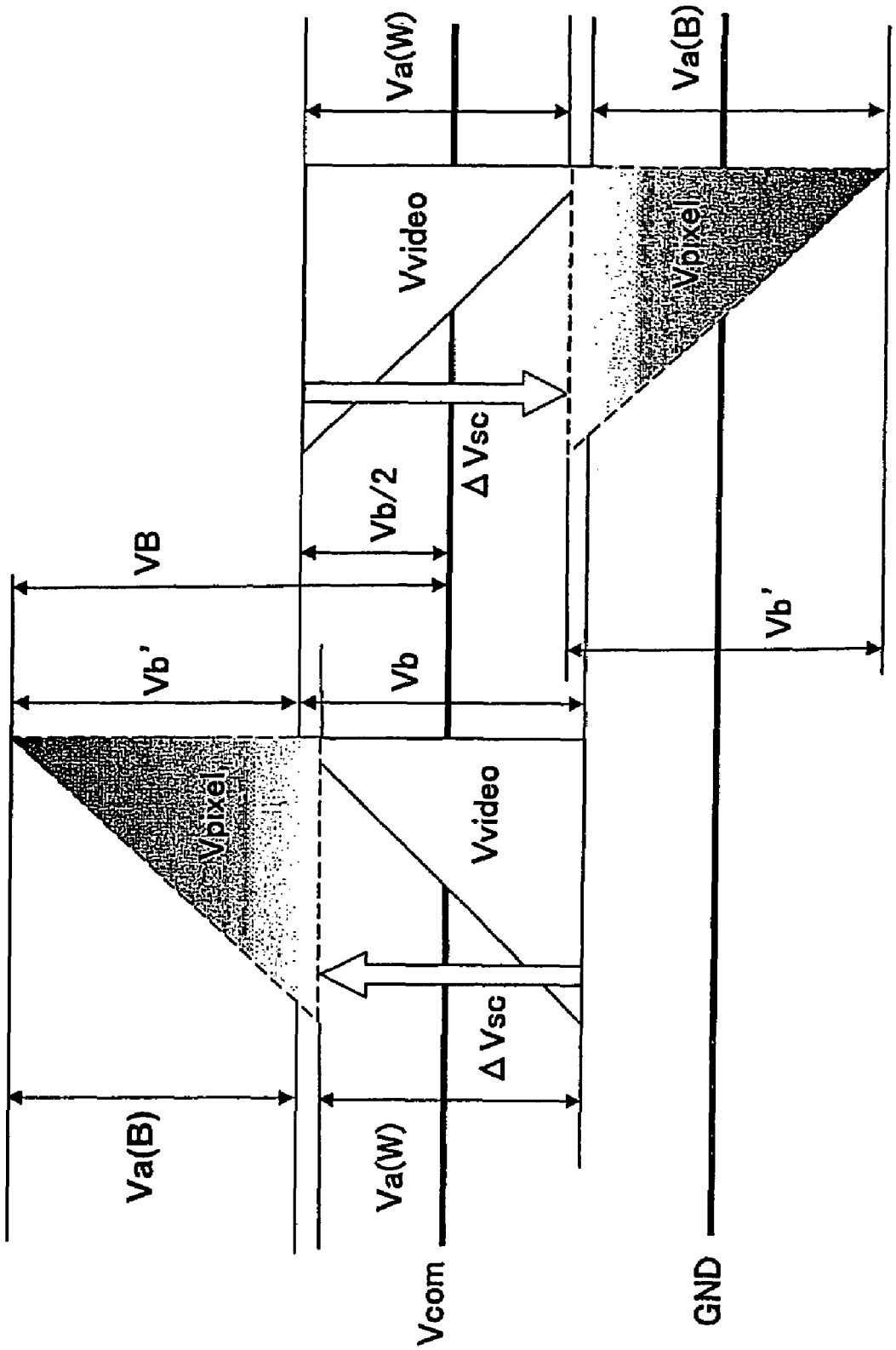
FIG. 3 shows the voltage shift states in the case of normally black.

The left side of FIG. 3 shows the data signal based on a first polarity and the hypotenuse of the triangle denoted by Vvideo represents the data signal (write voltage) corresponding to the brightness. The data signal has a potential difference (dynamic range) of Vb from the black level to the white level, and the voltage applied to the pixel electrode subsequent to shifting is white for the voltage closer to Vcom with the center at Vcom and black for the voltage farther from Vcom. Therefore, in this example, the white level is Vcom−Vb/2 and the black level is Vcom+Vb/2. Furthermore, at an adjacent pixel as shown on the right side in FIG. 3, the voltage has a second polarity that is opposite to that of the first polarity so that the white level is Vcom+Vb/2 and the black level is Vcom−Vb/2.

Figure 2:
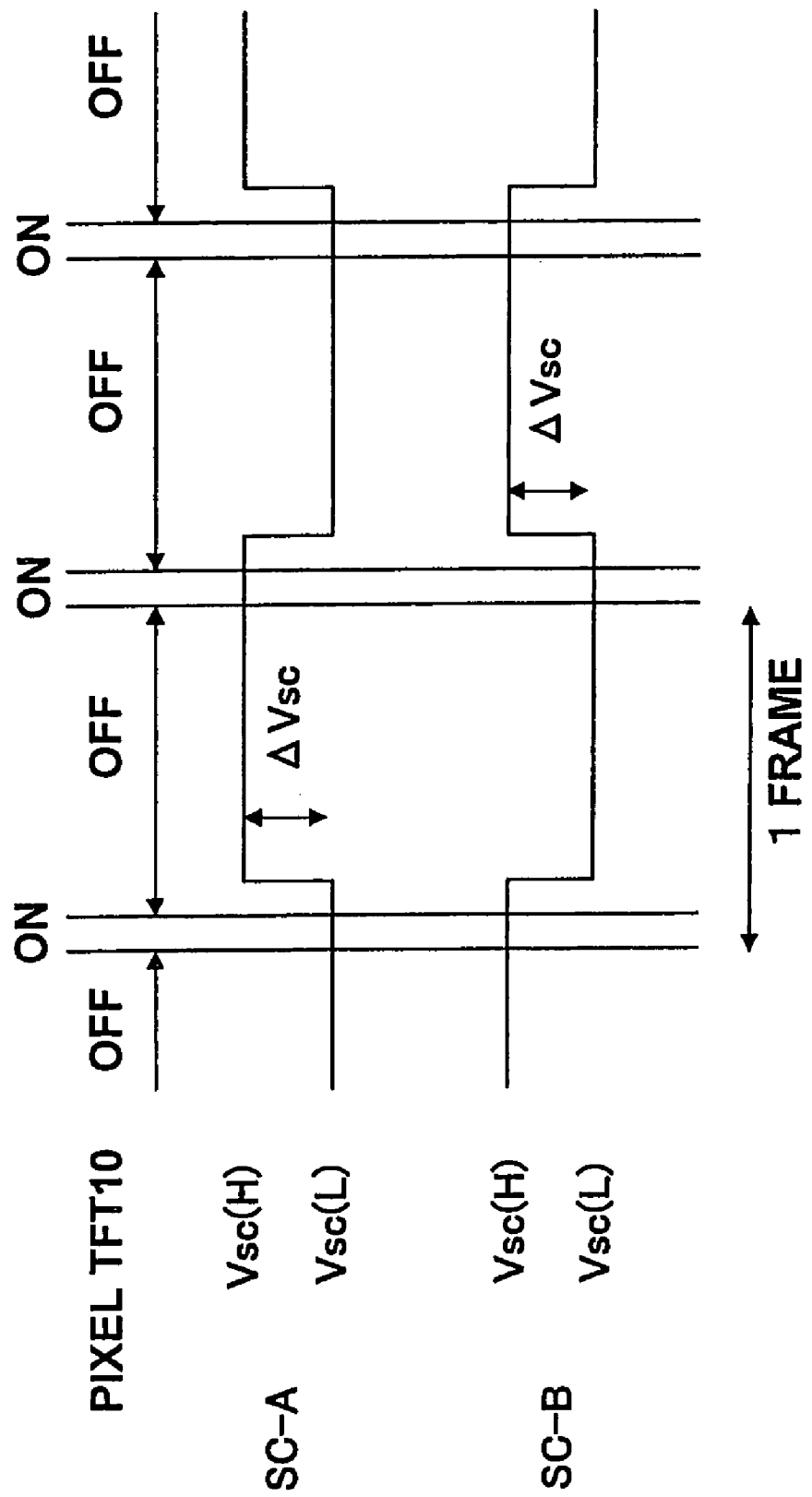
FIG. 2 shows the signal waveforms of capacitance lines SC-A and SC-B.

As shown in FIG. 2, after the pixel TFT 10 is turned on and the data write operation ends, the capacitance lines SC-A and SC-B shift only by a predetermined voltage ΔVsc. In this example, a normally white TN liquid crystal is used. Regarding the pixel on the left side of FIG. 3, the capacitance line SC-A is connected and Vsc shifts only by ΔVsc toward an increase in voltage. Furthermore, regarding the pixel on the right side of FIG. 3, the capacitance line SC-B is connected and Vsc shifts only by ΔVsc toward a decrease in voltage.

As a result, as shown in FIG. 3, the data signal applied to the pixel electrode shifts only by a voltage corresponding to ΔVsc and is applied across Vcom. Here, ΔVsc is set as a voltage corresponding to threshold voltage Vath where a change in transmissivity starts in accordance with the voltage applied to the liquid crystal, and the voltage subsequent to shifting makes it possible to perform display operations on the liquid crystal element 12. Furthermore, the dynamic range of the data signal is set so that the dynamic range subsequent to shifting becomes the potential difference of the white level from the black level in the display.

In FIG. 3, Va (W) is the amount of shift of the data signal for the white level and Va (B) is the amount of shift of the data signal for the black level. Therefore, these amounts of shift are determined by ΔVsc. Furthermore, Vb is the potential difference (dynamic range) of the black level and the white level of the data signal and Vb' is the dynamic range subsequent to shifting.

Figure 4:
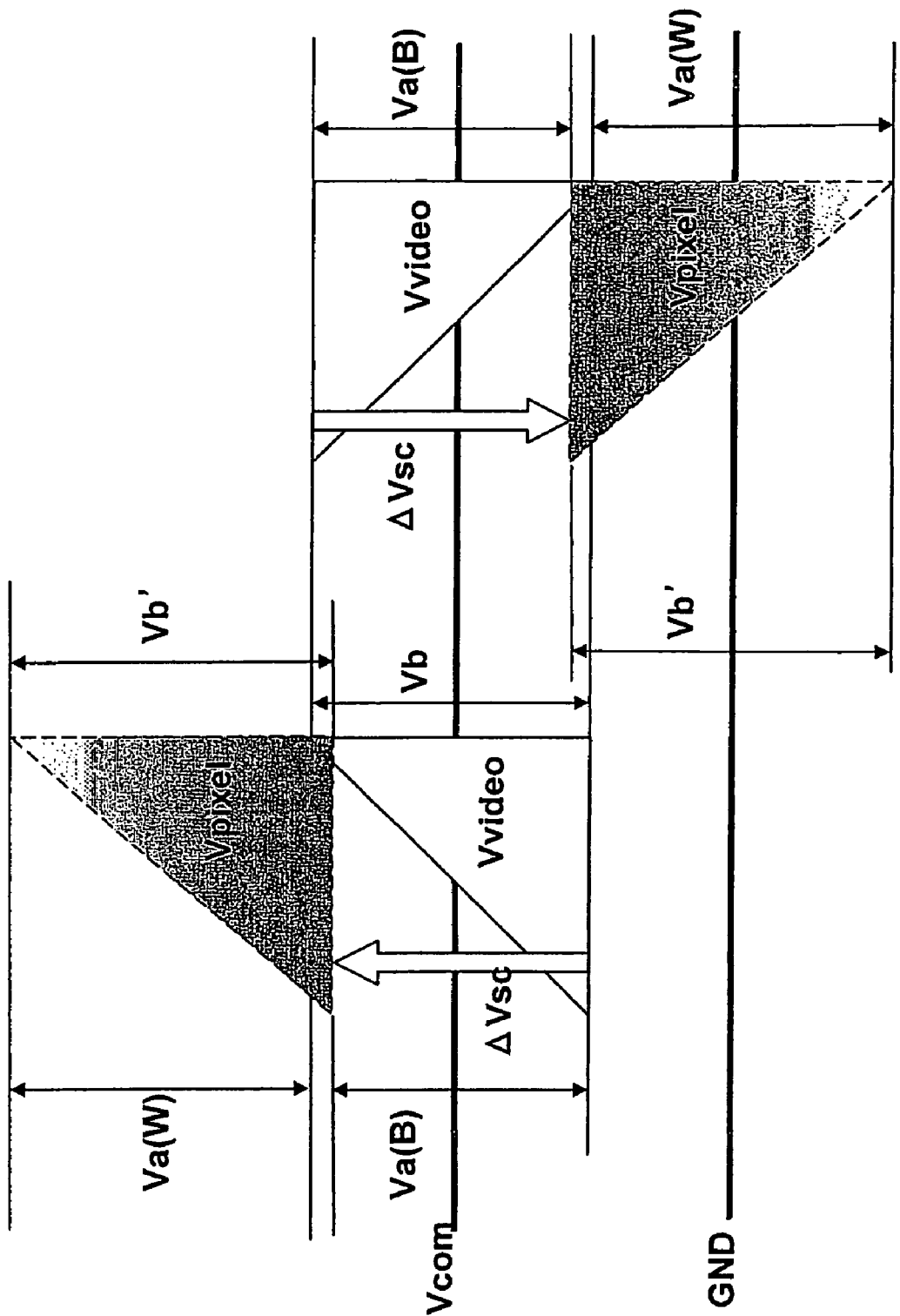
FIG. 4 shows the voltage shift states in the case of normally white.

The use of a normally-black vertically aligned (VA) type is shown in FIG. 4. In this manner, the data signal has the potential difference (dynamic range) of Vb, and the voltage applied to the pixel electrode subsequent to shifting is black for the voltage closer to Vcom with the center at Vcom and white for the voltage farther from Vcom. Therefore, in this example, the black level is Vcom−Vb/2 and the white level is Vcom+Vb/2. Furthermore, at an adjacent pixel as shown on the right side of FIG. 4, the voltage has a second polarity that is opposite to that of the first polarity so that the black level is Vcom+Vb/2 and the white level is Vcom−Vb/2.

The voltage value Vpixel of the pixel electrode of the liquid crystal element 12 subsequent to shifting can be expressed as follows:

$$V\text{pixel}=V\text{video}\pm\{(Csc-Cpa)/(Cgs+Clc+Csc+Cpa)\}\cdot\Delta Vsc \quad (1)$$

In this embodiment, a TN type normally-white liquid crystal is utilized. A black display operation is performed by the application of a voltage. With the black level voltage with respect to Vcom subsequent to shifting denoted by VB and the dynamic range during a write operation denoted by Vb, it is necessary to satisfy the following expression to perform the black display operation.

$$\{(Csc-Cpa)/(Cgs+Clc+Csc+Cpa)\}\cdot\Delta Vsc=VB-Vb/2 \quad (2)$$

Namely, Vb/2 corresponds to the black level voltage with respect to Vcom during a write operation and VB is the black level voltage subsequent to shifting so that VB−Vb/2 becomes the shift voltage.

Furthermore, the pixel circuit operates on the basis of the power source voltage VDD. Therefore, a shift voltage ΔVsc lower than VDD becomes an operating condition.

$$\Delta Vsc < VDD \quad (3)$$

Therefore, to satisfy expressions (2) and (3), it is necessary to form the pixel circuit.

On the other hand, the capacitance Clc of the liquid crystal element 12 is determined when panel size, number of pixels, and liquid crystal to be used are determined. Furthermore, the gate-source capacitance Cgs of the pixel TFT 10 is determined when the size of the pixel TFT 10 is determined. Therefore, major changes cannot be made in the design stage for the display panel.

Accordingly, the capacitance Csc of the storage capacitor 14 and the capacitance Cps of the parasitic capacitance 16 are varied in this embodiment. Namely, if the capacitance Csc of the storage capacitor 14 is increased to a certain proportion or greater compared with the capacitance Cps of the parasitic capacitance 16, expression (2) can be satisfied even when setting ΔVsc to a small value so that expression (3) can also be satisfied. By then setting ΔVsc to a small value, it is possible to design for lower power consumption.

Furthermore, setting Cpa so that ΔVsc does not exceed VDD obviates the need for providing a special power supply for the Vsc voltage generator circuit. Furthermore, advantages can be realized, such as lower power consumption, improved pixel aperture ratio, and so forth.

The parasitic capacitance 16 is provided at the same level as the gate electrode and an interlayer insulating film and a planarization film are found between it and the pixel electrode. Thickening this planarization film makes it possible to reduce the parasitic capacitance 16. On the other hand, to increase the storage capacitor 14, the gate oxide film may be made thinner. The capacitance of the storage capacitor 14 can be easily changed by changing its area. These techniques permit the capacitances of the storage capacitor 14 and the parasitic capacitance 16 to be adjusted.

SPECIFIC EXAMPLE

When configured so that Csc=320fF, Cpa=10fF, Clc=430fF, Cgs=3fF, ΔVsc=5.58, VB=3.5V, Vb=2.5V, and VDD=8.5V:

$$\{(320-Cpa)/(3+430+320+Cpa)\}\cdot\Delta Vsc=3.5-2.5/2$$

Furthermore:

$$\Delta Vsc<8.5$$

Therefore, in this case, Cpa<95fF can be derived for the capacitance of the parasitic capacitance 16.

For example, when Cpa is greater than or equal to 95fF and this condition is not satisfied, the shift voltage becomes insufficient and the black level display is not performed properly.

Furthermore, the voltage value Vpixel of the pixel electrode of the liquid crystal element 12 subsequent to shifting can be expressed as follows (identical to expression (1) given above):

$$Vpixel=Vvideo\pm\{(Csc-Cpa)/(Cgs+Clc+Csc+Cpa)\}\cdot\Delta Vsc$$

When Cgs and Cpa are substantially smaller than Csc and Clc, Vpixel can be expressed as follows:

$$Vpixel \square Vvideo \pm Csc/(Clc+Csc)\cdot\Delta Vsc$$

Furthermore, the molecules in the TN liquid crystal are aligned in parallel with respect to the electrodes in the state where voltage is not applied, at which time the dielectric constant $\in_{//}$ is smaller compared to the dielectric constant $\in_\perp$ when the molecules are vertically aligned with respect to the electrodes in the state were voltage is applied. Namely, $\in_\perp > \in_{//}$. Furthermore, Clc, which is the capacitance of the liquid crystal element, is determined by the dielectric constant of the liquid crystal material. Thus, $Clc_\perp > Clc_{//}$.

For this embodiment, a TN-type normally white liquid crystal is utilized. Accordingly, a black display operation is performed by the application of a voltage. With the black level voltage with respect to Vcom subsequent to shifting denoted by VB, the dynamic range during a write operation denoted by Vb, the black level voltage shift denoted by Va (B), and the white level voltage shift denoted by Va (W), Va (B) and Va (W) can be expressed as follows:

$$Va(B)=Csc/(Clc_\perp+Csc)\cdot\Delta Vsc$$

$$Va(W)=Csc/(Clc_{//}+Csc)\cdot\Delta Vsc$$

Thus, Va(W)>Va(B).

Furthermore, the dynamic range Vb' subsequent to shifting is expressed as follows:

$$Vb'=Vb-\{Va(W)-Va(B)\}$$

Thus, Vb'<Vb.

From these relationships, changing the magnitude of ΔVsc enables Va (B), Va (W), and Vb' to be changed.

In this embodiment, as described hereinbefore, Vsc (H) and Vsc (L) are changed by the setting signal so that the difference of both signals, ΔVsc, is changed. Due to the change in ΔVsc, the brightness and contrast are then adjusted. Namely, the brightness changes as Va (B) and Va (W) change, the contrast changes as Vb' changes, and the brightness and contrast are adjusted by the adjustment of ΔVsc.

The pixel circuit operates on the basis of the power source voltage VDD. Therefore, it is preferable for the shift voltage ΔVsc to be lower than VDD so as to satisfy ΔVsc<VDD.

Figure 5:
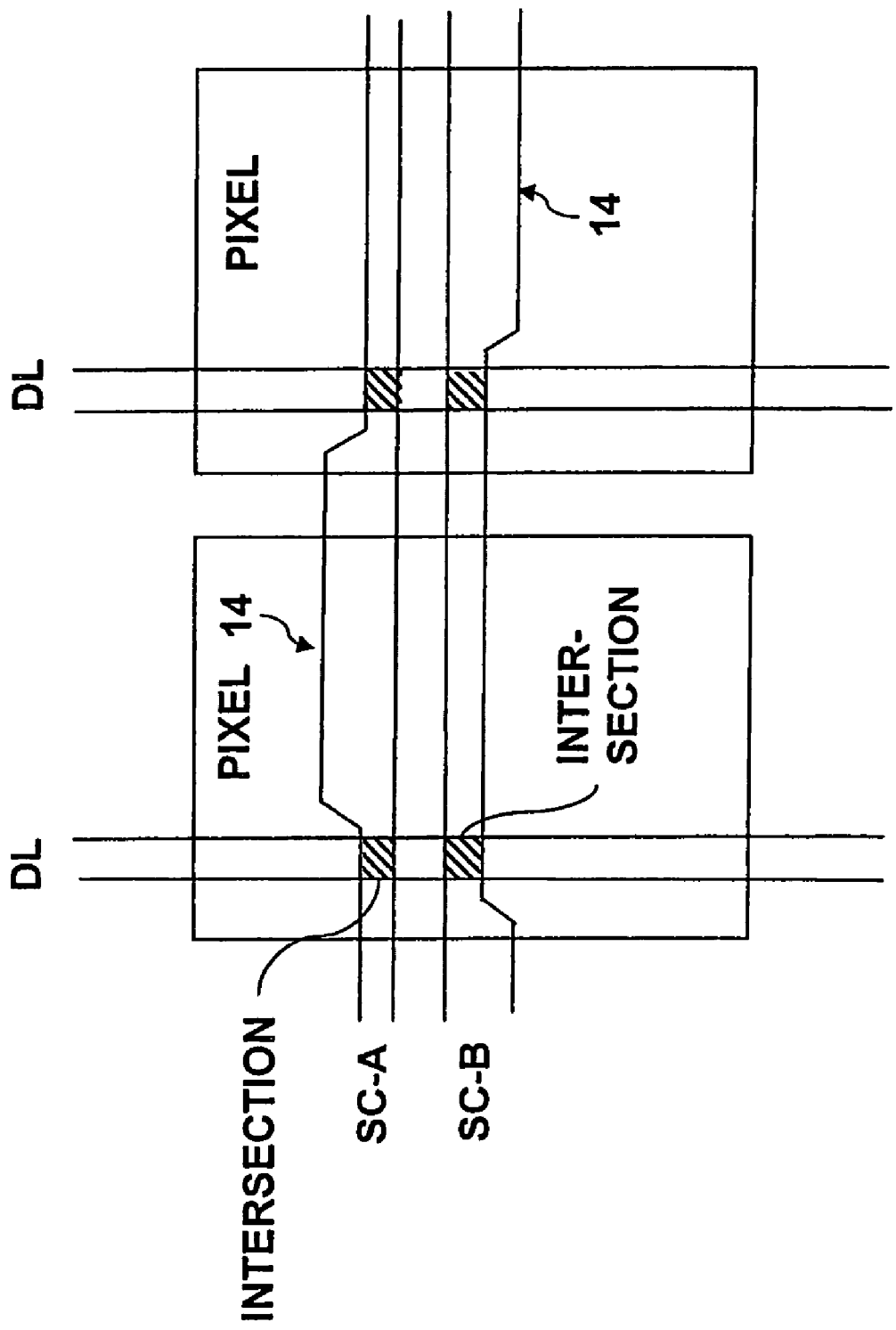
FIG. 5 shows a planar structure of pixel circuits.

FIG. 5 shows a schematic planar structure of a display panel. In this manner, the DL data line is disposed for each column in the column (vertical scan) direction and two capacitance lines, SC-A and SC-B, are disposed at each row in the row (horizontal scan) direction.

Although the DL data lines have a linear form and the same width, this is not necessary. Due to light shading between pixels, it is preferable to widen the line width at those points when DL data lines are used. Furthermore, in the case of a delta arrangement, the DL data lines inevitably become curved.

Furthermore, the capacitance lines SC-A and SC-B widen at the places where the storage capacitor 14 is formed to yield the capacitance. Moreover, in this example, part of the adjacent pixel is also utilized for the storage capacitor 14. Namely, by extending the semiconductor layer (electrode on the opposite side of the storage capacitor line SC-A) that forms the storage capacitor 14 in the pixel on the left side of the figure, parts between pixels and of adjacent pixels are also utilized for the storage capacitor 14. Furthermore, as will be described hereinafter, the lower part of the data line is also utilized as part of the storage capacitor 14.

It is preferable to narrow the line widths only at the intersections between the DL data lines and the storage capacitor lines SC-A and SC-B so as to reduce the areas at these intersections.

The areas at the intersections of the storage capacitor lines SC-A and SC-B and the DL data lines are made uniform. As a result, the values of the parasitic capacitances formed from the storage capacitor lines SC-A and SC-B with the DL data lines become uniform and the fluctuations in potential of the DL data lines during inversion of the storage capacitor lines SC-A and SC-B can be reduced so as to minimize any adverse effect on the display.

Figure 6:
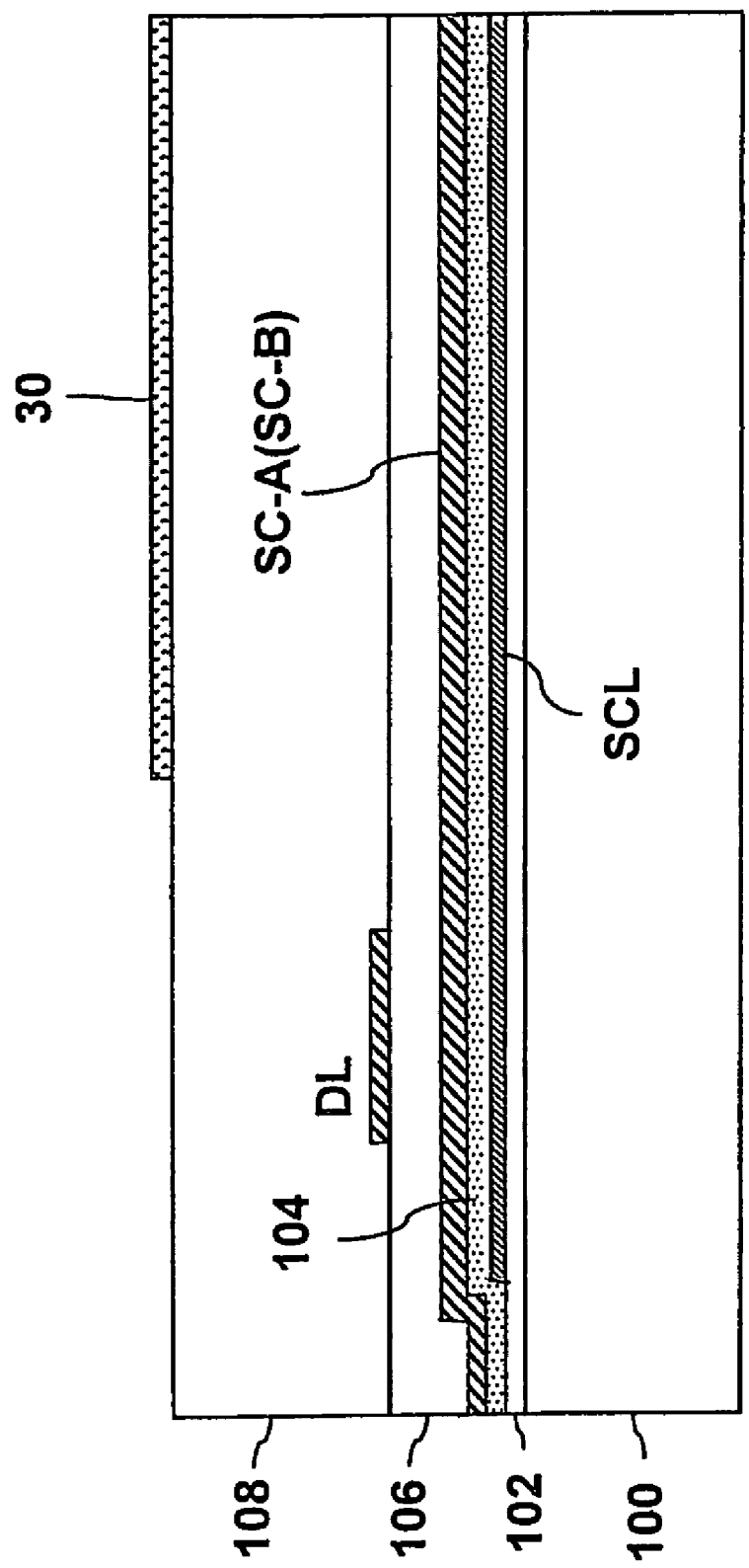
FIG. 6 shows a cross-sectional structure of pixel circuits.

FIG. 6 shows a cross section of a part where one storage capacitor line SC is disposed. In this manner, on a glass substrate 100 is provided a buffer layer 102 on which is provided a semiconductor layer SCL. Although the semiconductor layer SCL forms the pixel TFT 10, the part shown forms the storage capacitor 14. On the semiconductor layer SCL is formed an oxide film 104. The oxide film 104 is formed by a process identical to that for the gate oxide film of the pixel TFT 10. On the gate oxide film 104 is formed the storage capacitor line SC. The storage capacitor line SC is formed by a process identical to that for the gate electrode of the pixel TFT 10.

On the storage capacitor line SC is formed an interlayer insulating film 106 on which the data line DL is formed.

Furthermore, a planarization layer 108 is formed to cover the data line DL and on it is formed a pixel electrode 30. Although not shown, a liquid crystal layer is provided via an alignment film the pixel electrode 30 and on it is disposed an opposing substrate formed with a common electrode to sandwich the liquid crystal layer.

In this manner, the storage capacitor line SC and the data line DL oppose each other via the interlayer insulating film 106 at the intersection. Therefore, a capacitance develops at this part. In this example, the semiconductor layer SCL extends below the intersection and is utilized as part of the storage capacitor 14.

Figure 7:
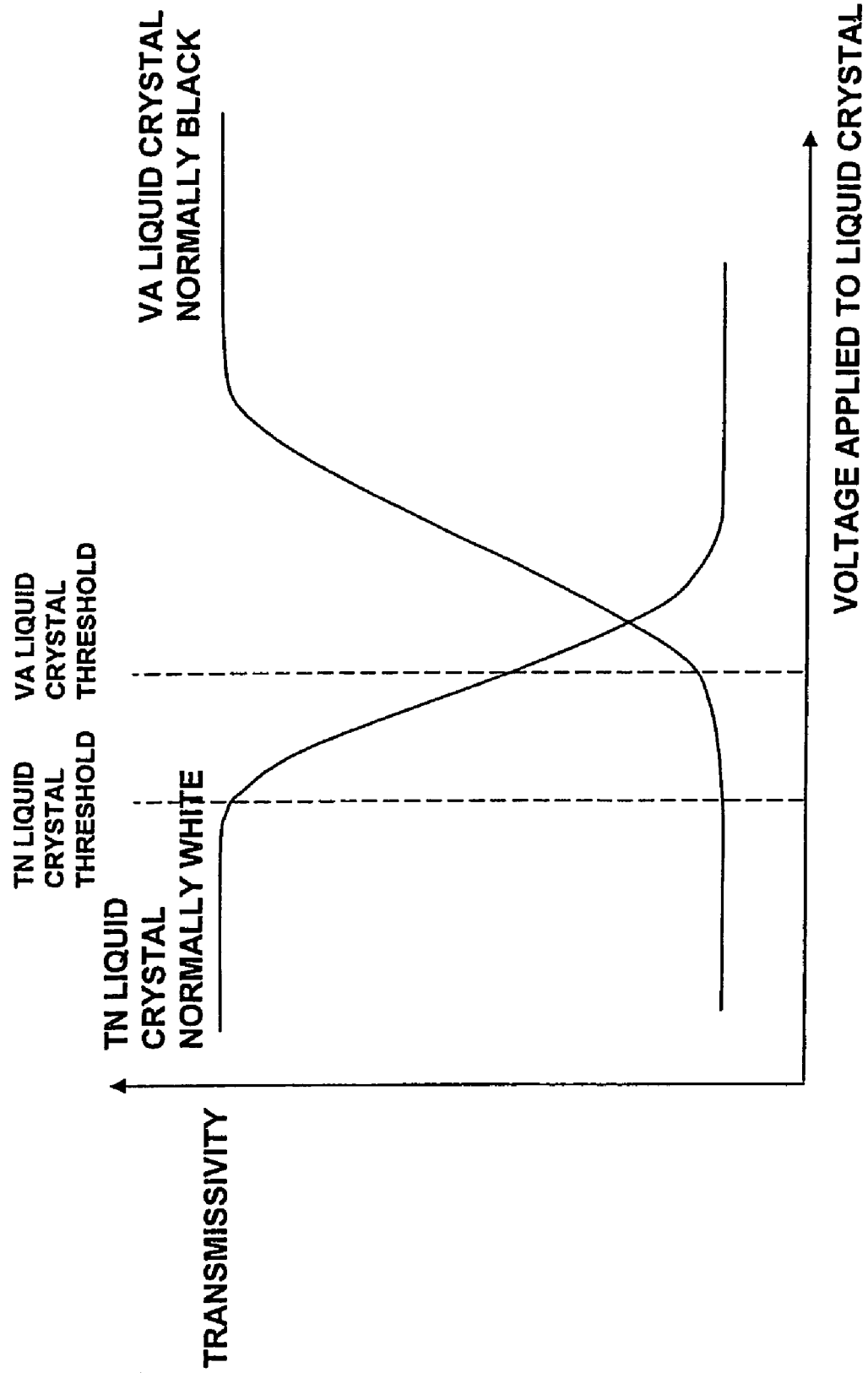
FIG. 7 shows the change in transmissivity for TN liquid crystals and VA liquid crystals.

Furthermore, FIG. 7 shows the transmissivity with respect to an applied voltage to the TN liquid crystal and to the VA liquid crystal. In the case of the TN liquid crystal, as the voltage applied to the liquid crystal is raised, the initial transmissivity is at a certain high level (white level), and when the voltage applied to the liquid crystal exceeds a threshold voltage, the transmissivity begins to decrease. Thereafter, the transmissivity decreases at a certain rate until a certain low level (black level). On the other hand, in the case of the VA liquid crystal, when the voltage applied to the liquid crystal is raised, the initial transmissivity is at a certain low level (black level), and when the voltage applied to the liquid crystal exceeds a threshold voltage, the transmissivity begins to increase. Thereafter, the transmissivity increases at a certain rate until a certain high level (white level).

Furthermore, although the voltage range (dynamic range) necessary for the display in the TN liquid crystal and in the VA liquid crystal differs as shown in FIG. 7, the voltage range can be adjusted by changing $\Delta V_{sc}$ in this embodiment.

In the SC driver 22 in this embodiment, the power source voltages VDD and VSS used in the vertical driver 20 or the voltages input by the panel are utilized for the H level voltage ($V_{SC}$(H)) and/or L level voltage ($V_{SC}$(L)) in the capacitance lines SC (SC-A or SC-B). Besides VDD and VSS, a GND potential is also supplied to the vertical driver 20. Namely, the vertical driver 20 includes the shift register for driving the gate line GL and utilizes the GND potential in the shift register. Accordingly, the GND potential can also be used for one of either the H level voltage ($V_{SC}$(H)) or the L level voltage ($V_{SC}$(L)). Moreover, another potential is usable provided that potential is input by the panel. Therefore, it is preferable to utilize the potentials utilized in the vertical driver 20 for both the H level voltage ($V_{SC}$(H)) and the L level voltage ($V_{SC}$(L)) in the SC driver 22. In the description hereinafter, an example is given where VDD or VSS is basically utilized for either the H level voltage ($V_{SC}$(H)) or the L level voltage ($V_{SC}$(L)).

Namely, as shown in FIG. 8, a display control signal, which becomes an H level, is supplied to the control terminals of switches SW1 and SW2 for the period where the H level is supplied to the capacitance line SC. Switches SW1 and SW2 are respectively an n-channel TFT and a p-channel TFT connected in parallel. The gate of the p-channel TFT of switch SW1 and the gate of the n-channel TFT of switch SW2 are connected and to this connection is supplied a display control signal that has been inverted by an inverter. The display control signal is supplied to the gate of the n-channel TFT of switch SW1 and the gate of the p-channel TFT of switch SW2. Furthermore, VDD or $V_{SC}$ (H) is input by the input of switch SW1 and $V_{SC}$(L) or VSS is input by the input of switch SW2, for example. The outputs of switches SW1 and SW2 are connected to the capacitance line SC-A or SC-B.

Namely, although the SC driver 22 requires two voltages to drive the capacitance lines SC-A and SC-B, either one or both voltages in this embodiment is set as VDD or VSS to be utilized in the vertical driver 20. For example, when $V_{SC}$ (L) is utilized for the L level, the H level is VDD, and when $V_{SC}$ (H) is utilized for the H level, the L level is VSS or the voltage that is input by the panel. Therefore, since only one of either $V_{SC}$(H) or $V_{SC}$(L) and not both need be generated, the power source circuit can be simplified. Furthermore, since the SC driver 22 is provided in proximity to the vertical driver 20, the wiring for VDD or VSS to be input by the vertical driver 20 for input by the SC driver 22 may be short.

For the circuit shown in FIG. 8, one circuit is provided per capacitance line SC (SC-A or SC-B). $V_{SC}$ (L) is determined with respect to VDD or VSC (H) is determined with respect to VSS so that, for example, the difference between the H level and the L level becomes $\Delta V_{sc}$.

Due to the circuit of FIG. 8, when the display control signal is at the H level switch SW1 turns on so that $V_{SC}$ (H), for example, is output, and when the display control signal is at the L level, switch SW2 turns on so that $V_{SS}$, for example, is output.

Figure 9A:
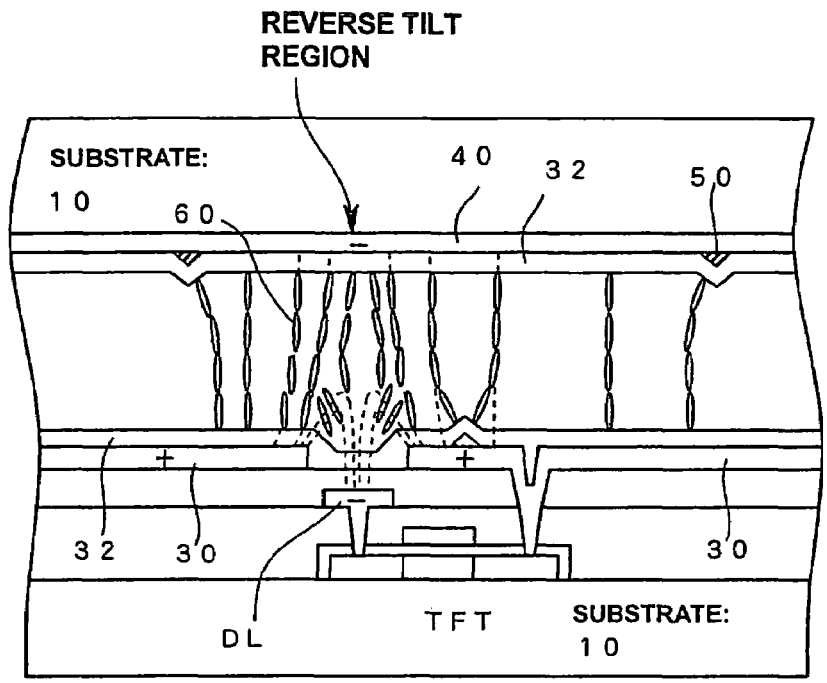
FIG. 9 shows a structure and operation of a VA mode pixel.
Figure 9B:
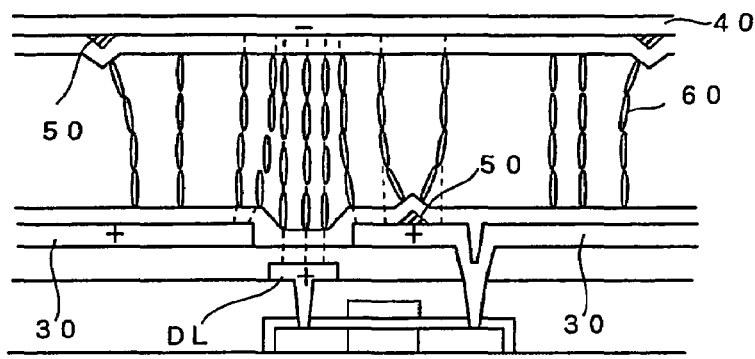
Figure 9C:
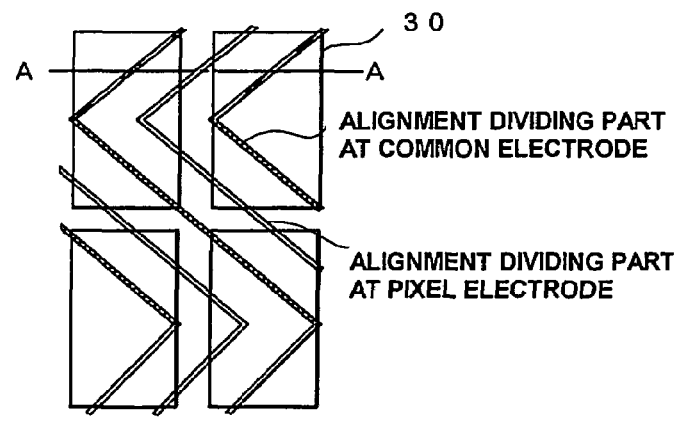

The configuration and operation of a pixel in a VA mode display device using VA liquid crystals are described herein with reference to FIG. 9(a) to FIG. 9(c).

FIG. 9(a) and FIG. 9(b) are schematic cross sections of the VA mode liquid crystal display device (LCD) using VA liquid crystals along line A-A of the LCD having the schematic cross section shown in FIG. 9(c). This LCD normally employs a rubbing-less type alignment film where a rubbing process is not performed. For this reason, the initial alignment of the liquid crystal has no pre-tilt angle, and when voltage is not applied, the direction of the major axis of the liquid crystal molecule is aligned facing the normal line of the substrate. As shown in FIG. 9(a) and FIG. 9(b) where a liquid crystal molecule 60 is initially aligned in the vertical direction, as a voltage is applied between the pixel electrode 30 and a common electrode 40 of the LCD, a weak electric field (refer to electric lines of force indicated by dotted lines in the figure) generated in a state of low initial voltage is tilted at an angle, such as at the end of the pixel electrode 30. The direction along which the liquid crystal molecule slants following the rise in voltage is defined according to this tilted electric field.

As shown in the figure, an alignment dividing part 50 is provided within the region for each one pixel so that a plurality of regions within the one pixel region can be divided into various directions. In the example of FIG. 9(a)-(c), the alignment dividing part 50 is formed by providing projections on electrodes and electrode-free regions (windows) so that a pattern extends in the form of polygonal lines respectively in the vertical direction on the screen for both the common electrode 40 and the pixel electrode 30. It should be noted that the alignment dividing part 50 is not limited to this pattern and may be formed, for example, by providing electrode-free regions (windows) and projections in a pattern where the lengthwise top end and bottom end within one pixel are divided in a forked manner. Due to the alignment dividing part 50 as shown in FIG. 9(*a*) and FIG. 9(*b*), the boundary of the liquid crystal alignment direction within one pixel can be fixed at the dividing part 50, and the boundary position within the pixel of the direction in which the liquid crystal molecule tilts differs depending on the pixel and the particular drive timing so as to prevent an adverse effect on the display quality, such as display flickering.

In the embodiment, the display operation is performed only by the light from a light source, such as one disposed in the back of the panel, so that it is applicable to any type of transmissive LCDs employing transparent conducting electrodes, such as ITO; for both the pixel electrodes and common electrode, reflective LCDs that perform display operations by reflecting ambient light using reflective metal electrodes for the pixel electrodes, and also semi-transmissive LCDs that function in a transmissive mode when a light source is used and in a reflective mode when the light source is turned off. Although improvements, such as greater contrast, are demanded in reflective LCDs and semi-transmissive LCDs, performing polarity inversion as in the embodiment makes it possible to perform display operations at a sufficiently high contrast even with reflective or semi-transmissive LCDs in the ECB mode, for example.

What is claimed is:

1. A display device having pixel circuits disposed in a matrix, each pixel circuit comprising:
    a pixel TFT that is turned on and off by connecting one end to a data line for supplying a data signal, connecting a gate to a selection line, and setting a selection signal on the selection line to an H level or an L level;
    a storage capacitor for storing a voltage of the data signal supplied from the data line, one end of which is connected to another end of the pixel TFT and the other end of which is connected to a storage capacitor line; and
    a liquid crystal element for applying a voltage to a liquid crystal between electrodes, one electrode of which is connected to said another end of the pixel TFT and the other electrode of which is held at a common electrode potential;
    wherein said storage capacitor line, after said pixel TFT is turned on and the data signal on the data line is written to the storage capacitor, changes from a first level to a second level causing a voltage to be applied to the liquid crystal element to shift by a predetermined voltage;
    said storage capacitor line is provided with two lines to correspond to each pixel circuit row, each of a plurality of pixel circuits disposed in a row direction is connected to only either one of the two storage capacitor lines; and
    said predetermined voltage, which is a difference between the first level and second level in said storage capacitor line, can be changed by changing the first level and/or the second level.

2. A display device according to claim 1, comprising:
    a voltage generator circuit for generating voltages of the first level and the second level of said storage capacitor line and a data memory for storing a value regarding a voltage that is generated;
    wherein said voltage generator circuit determines values of the generated first level and second level on the basis of data that is output from the data memory.

3. A display device according to claim 2, wherein:
    said data memory outputs data in response to an input setting signal.

4. A display device according to claim 3, wherein:
    said setting signal is determined according to display brightness or contrast of the display device.

5. A display device according to claim 1, wherein:
    when one potential of said two types of potentials changes in a positive to negative direction or a negative to positive direction, the other potential shifts in an opposite direction.

6. A display device according to claim 1, wherein:
    capacitances generated at locations where said two storage capacitor lines and said data line intersect are set to be substantially the same.

7. A display device according to claim 1, wherein:
    capacitances generated at locations where said two storage capacitor lines and said data line intersect are set to be substantially the same.

8. A display device according to claim 1, wherein:
    the areas where said two storage capacitor lines and said data line intersect are substantially the same.

9. A display device according to claim 1, wherein:
    said two storage capacitor lines have their areas enlarged inside a pixel connecting the pixel circuit.

10. A display device according to claim 1, wherein:
    when one potential of said two types of potentials changes in a positive to negative direction or a negative to positive direction, the other potential shifts in an opposite direction.

* * * * *